(12) United States Patent
Frink

(10) Patent No.: US 9,363,186 B2
(45) Date of Patent: Jun. 7, 2016

(54) HIERARCHICAL SHAPING OF NETWORK TRAFFIC

(71) Applicant: Juniper Networks, Inc., Sunnyvale, CA (US)

(72) Inventor: Craig R. Frink, Chelmsford, MA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 14/700,933

(22) Filed: Apr. 30, 2015

(65) Prior Publication Data
US 2015/0236961 A1    Aug. 20, 2015

Related U.S. Application Data

(63) Continuation of application No. 10/912,041, filed on Aug. 6, 2004, now Pat. No. 9,031,079.

(51) Int. Cl.
| | |
|---|---|
| H04L 12/815 | (2013.01) |
| H04J 3/24 | (2006.01) |
| H04L 12/54 | (2013.01) |
| H04L 12/875 | (2013.01) |
| H04L 12/863 | (2013.01) |
| H04L 12/935 | (2013.01) |

(52) U.S. Cl.
CPC ............... *H04L 47/22* (2013.01); *H04J 3/247* (2013.01); *H04L 12/5601* (2013.01); *H04L 12/5693* (2013.01); *H04L 47/568* (2013.01); *H04L 47/6205* (2013.01); *H04L 49/3081* (2013.01)

(58) Field of Classification Search
None
See application file for complete search history.

(56) References Cited

U.S. PATENT DOCUMENTS

| | | | |
|---|---|---|---|
| 5,499,238 A | 3/1996 | Shon | |
| 5,579,312 A | 11/1996 | Regache | |
| 5,850,399 A | 12/1998 | Ganmukhi et al. | |
| 6,035,348 A | 3/2000 | Webber et al. | |
| 6,307,852 B1 | 10/2001 | Fisher et al. | |
| 6,438,134 B1 | 8/2002 | Chow et al. | |
| 6,459,681 B1 * | 10/2002 | Oliva | H04L 12/5601 370/232 |
| 6,570,883 B1 | 5/2003 | Wong | |
| 6,643,293 B1 | 11/2003 | Carr et al. | |
| 6,807,171 B1 * | 10/2004 | Chow | H04L 12/5601 370/230.1 |
| 6,810,012 B1 | 10/2004 | Yin et al. | |
| 7,023,843 B2 | 4/2006 | Ruutu et al. | |
| 7,280,542 B2 | 10/2007 | Hassan-Ali et al. | |
| 7,304,944 B2 | 12/2007 | Bitar et al. | |
| 7,417,999 B1 | 8/2008 | Charny et al. | |
| 7,457,247 B1 | 11/2008 | Frink | |
| 7,583,596 B1 | 9/2009 | Frink | |
| 7,606,158 B2 | 10/2009 | Fedorkow et al. | |
| 7,719,977 B2 | 5/2010 | Sisto et al. | |
| 9,031,079 B1 | 5/2015 | Frink | |
| 2001/0001608 A1 | 5/2001 | Parruck et al. | |
| 2005/0047415 A1 | 3/2005 | Channegowda et al. | |
| 2006/0067225 A1 | 3/2006 | Fedorkow et al. | |
| 2008/0159297 A1 | 7/2008 | Grosbach et al. | |

OTHER PUBLICATIONS

McDysan et al., The ATM Forum Technical Committee Traffic Management Specification, version 4, Apr. 1996.

* cited by examiner

*Primary Examiner* — Vincelas Louis
(74) *Attorney, Agent, or Firm* — Harrity & Harrity, LLP

(57) ABSTRACT

Stacked (i.e., hierarchically arranged) rate wheels schedule traffic flows in a network. A first rate wheel operates to efficiently schedule traffic flows in which traffic shaping parameters may be applied to individual traffic flows. A second rate wheel schedules group of the traffic flows in which traffic shaping parameters may be applied at the group level. In the context of an ATM network, the first rate wheel may operate at the virtual circuit level and the second rate wheel may operate at the virtual path level.

20 Claims, 14 Drawing Sheets

HIERARCHICAL SHAPING OF NETWORK TRAFFIC

RELATED APPLICATION

This application is a continuation of U.S. patent application Ser. No. 10/912,041, filed Aug. 6, 2004 (now U.S. Pat. No. 9,031,079), which is incorporated herein by reference.

BACKGROUND OF THE INVENTION

A. Field of the Invention

Concepts consistent with the principles of the invention relate generally to networking, and more particularly, to segmentation and reassembly (SAR) techniques for data units.

B. Description of Related Art

Segmentation and reassembly (SAR) is the process of breaking a data unit, such as a packet, into smaller units, such as ATM cells, and later reassembling them into the proper order. Alternatively, a SAR system may receive ATM cells, reassemble the cells into packets, process the packets, and then break the processed packets into cells for re-transmission.

SAR systems are commonly used in networking environments. A router, for instance, may receive ATM cells over a network and reassemble the cells into packets. The packets may then be processed by, for example, analyzing each packet to determine its next destination address and output port. The router may then segment the packets back into fixed lengths cells, which are then transmitted on the network.

In a network router, multiple traffic flows may compete for limited network bandwidth. The router is faced with the task of allocating the total bandwidth available at a particular output port among the traffic flows. In the context of an ATM SAR system, the SAR may segment packet flows into ATM cells that correspond to multiple ATM virtual circuits. The virtual circuits contest for the bandwidth of the output port.

SUMMARY

One aspect consistent with principles of the invention is a device that includes a first rate wheel configured to schedule data traffic flows and a second rate wheel, arranged hierarchically relative to the first rate wheel, and configured to schedule groupings of the data traffic flows.

Another aspect consistent with principles of the invention is a system that comprises a number of elements. In particular, the system includes an output port configured to transmit data from traffic flows associated with virtual paths and a scheduling component. The scheduling component includes a first circular memory structure configured to schedule the traffic flows on a per-flow basis and a second circular memory structure, arranged hierarchically relative to the first circular memory structure, configured to schedule the traffic flows on a per-virtual path basis.

Another aspect consistent with principles of the invention is a method that includes scheduling data flows based on first traffic shaping parameters assigned to the flows and scheduling the data flows as groups of the data flows and based on second traffic shaping parameters assigned to the groups.

BRIEF DESCRIPITON OF THE DRAWINGS

The accompanying drawings, which are incorporated in and constitute a part of this specification, illustrate the invention and, together with the description, explain the invention. In the drawings, FIG. 1 is a block diagram illustrating an exemplary routing system in which concepts consistent with the principles of the invention may be implemented;

Figure 11A:
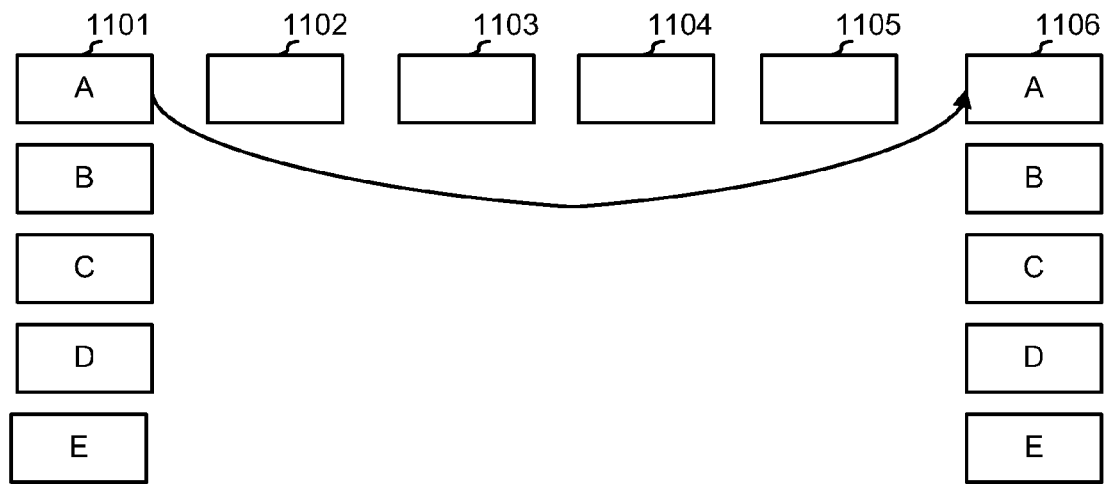
Figure 12:
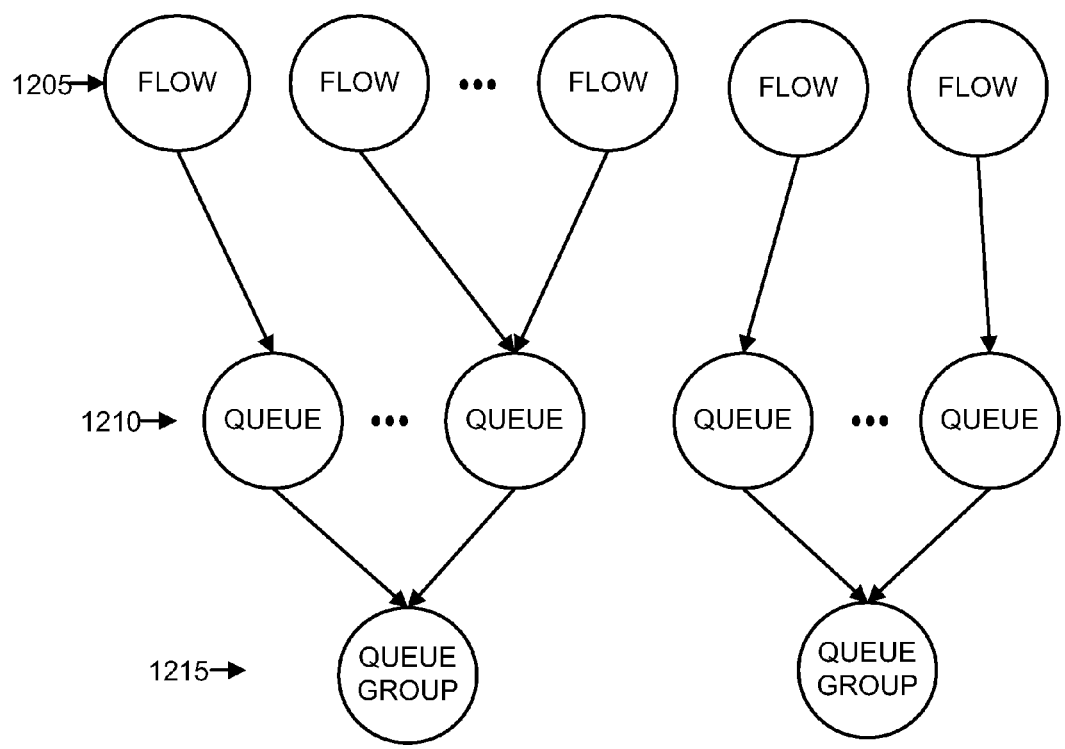
Figure 13:
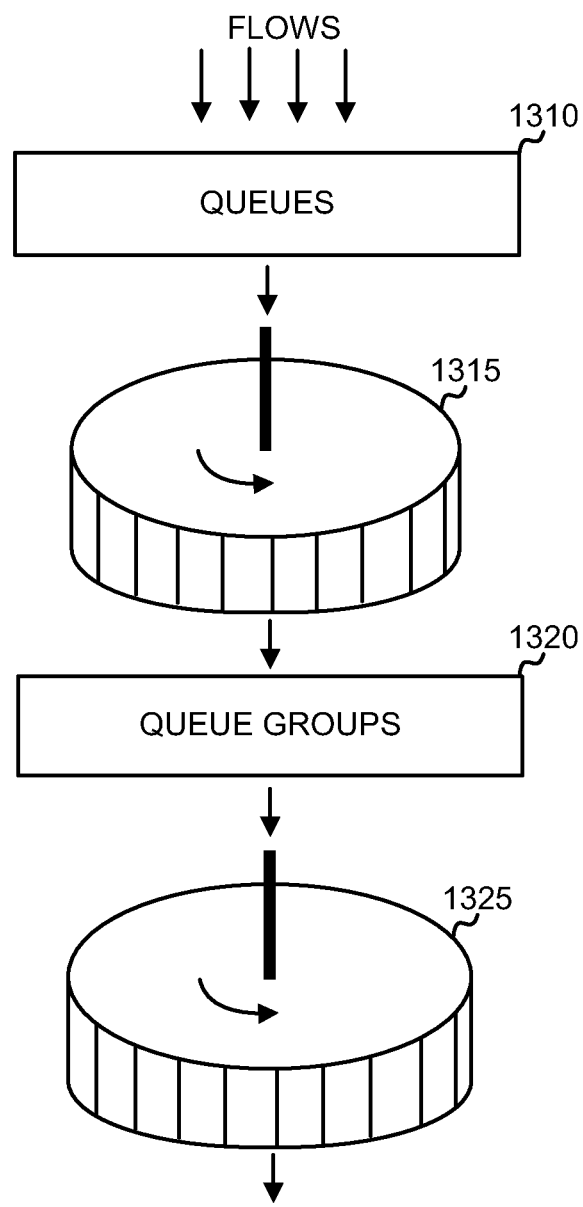
Figure 14:
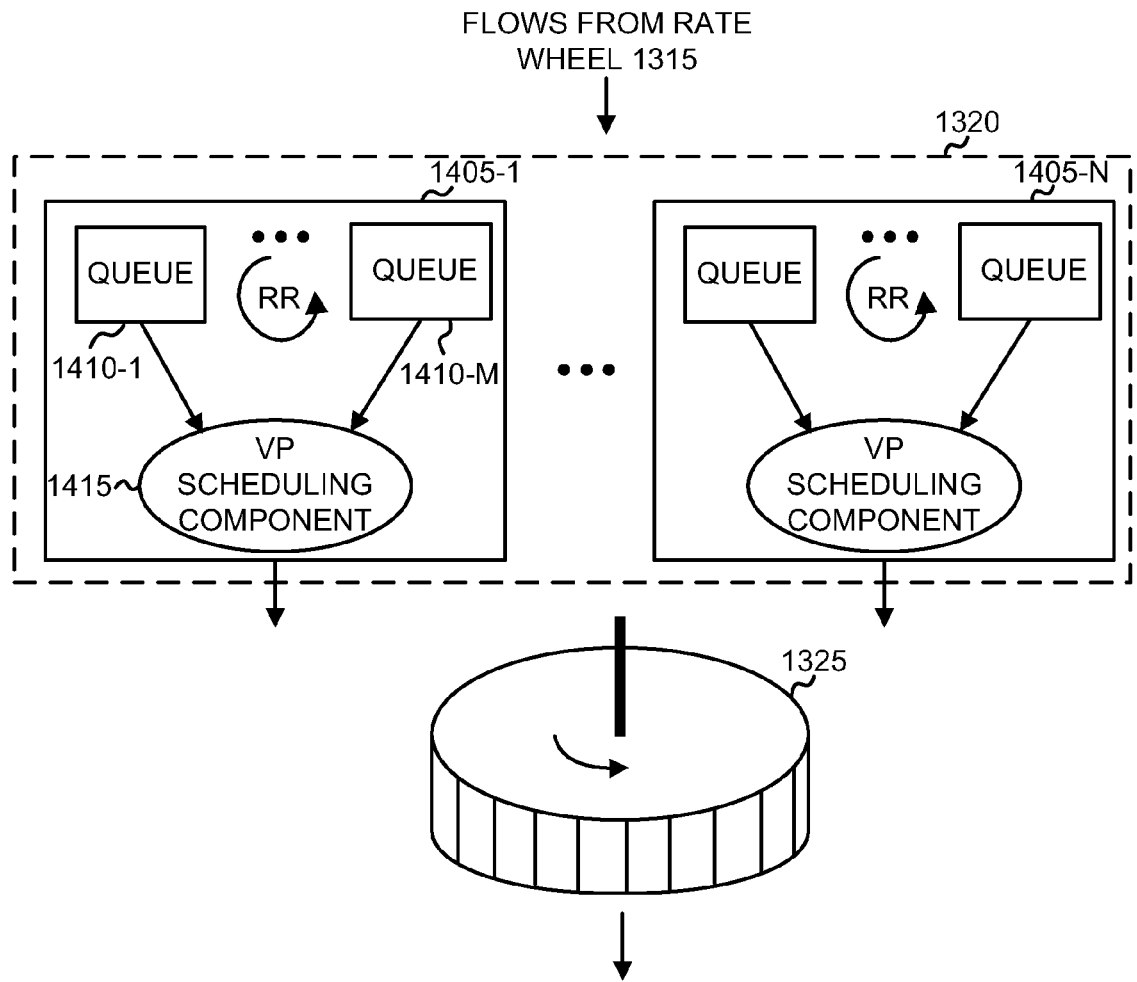

FIGS. 11A and 11 B are diagrams that conceptually illustrate an exemplary set of de-queue operations;

FIG. 12 is a diagram illustrating the concept of a queue group;

FIG. 13 is a diagram conceptually illustrating hierarchical shaping of queue groups consistent with an aspect of the invention; and FIG. 14 is a diagram illustrating an exemplary implementation of queue groups and a rate wheel.

DETAILED DESCRIPTION

The following detailed description of the implementations of the principles of the invention refers to the accompanying drawings. The same reference numbers may be used in different drawings to identify the same or similar elements. Also, the following detailed description does not limit the invention. Instead, the scope of the invention is defined by the appended claims and equivalents.

As described herein, data units, such as ATM cells, are efficiently scheduled for transmission using rate wheels. The rate wheels may be hierarchically stacked. For example, a first rate wheel may schedule data units on a per-flow (queue) basis, while a succeeding rate wheel may schedule the data units on a per-virtual path (queue group) basis. In the context of ATM transmissions, the techniques described herein allow separate transmission rates to be set at the virtual circuit (VC) level and virtual path level.

System Overview

Figure 1:
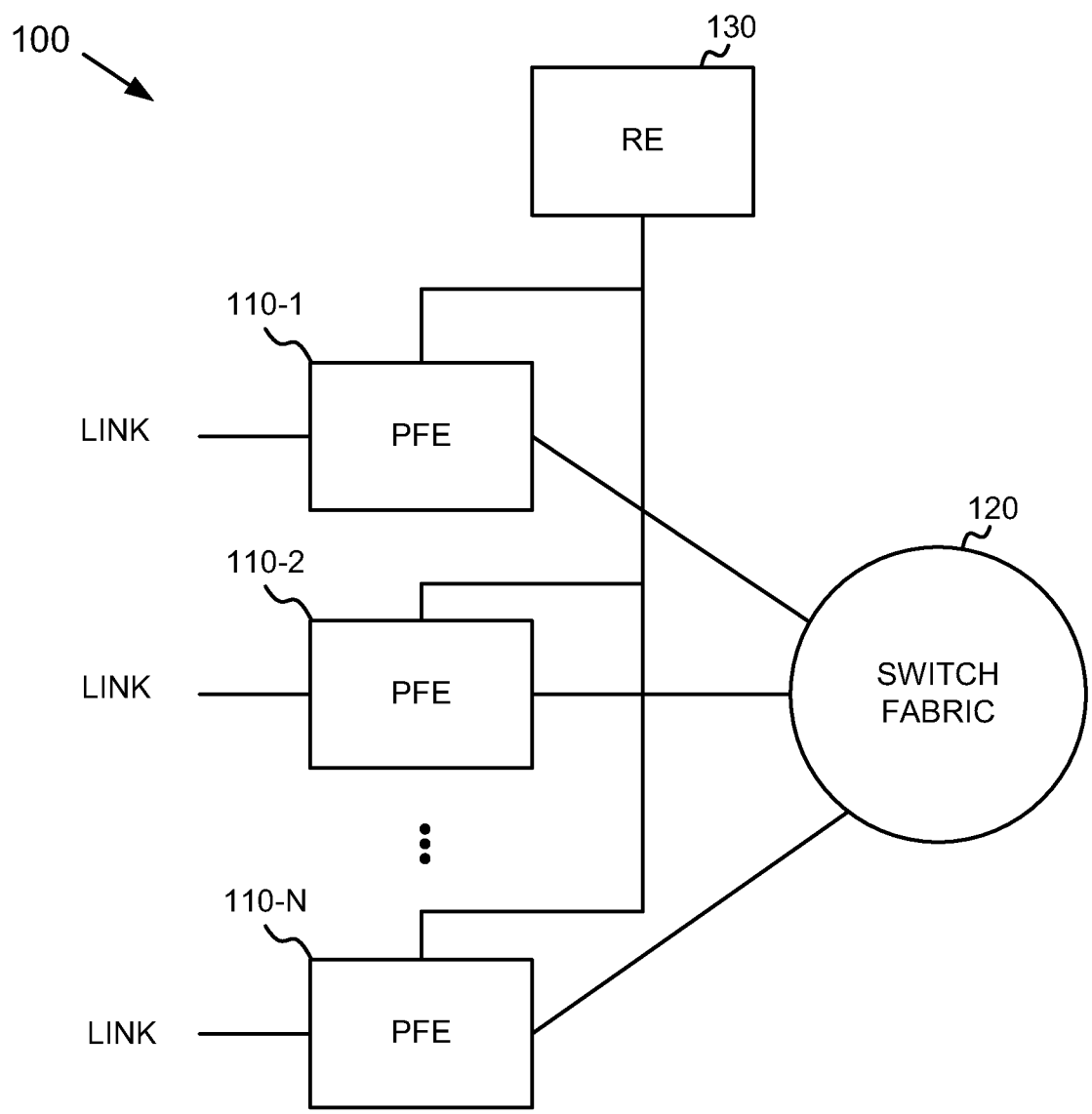

FIG. 1 is a block diagram illustrating an exemplary routing system 100 in which concepts consistent with the principles of the invention may be implemented. System 100 may receive one or more packet streams from physical links, process the packet stream(s) to determine destination information, and transmit the packet stream(s) out on links in accordance with the destination information. System 100 may include packet forwarding engines (PFEs) 110-1 through 110-N (collectively referred to as packet forwarding engines 110), a switch fabric 120, and a routing engine (RE) 130.

RE 130 may perform high level management functions for system 100. For example, RE 130 may communicate with other networks and/or systems connected to system 100 to exchange information regarding network topology. RE 130 may create routing tables based on network topology information, create forwarding tables based on the routing tables, and forward the forwarding tables to PFEs 110. PFEs 110 may use the forwarding tables to perform route lookups for incoming packets. RE 130 may also perform other general control and monitoring functions for system 100.

PFEs 110 may each connect to RE 130 and switch fabric 120. PFEs 110 may receive packet data on physical links connected to a network, such as a wide area network (WAN), a local area network (LAN), or another type of network. Each physical link could be one of many types of transport media, such as optical fiber or Ethernet cable. The data on the physical link is transmitted according to one of several protocols, such as the synchronous optical network (SONET) standard. The data may take the form of data units, where each data unit may include all or a portion of a packet. For ATM transmissions, for instance, the data units may be cells.

A PFE 110-x (where PFE 110-x refers to one of PFEs 110) may process incoming data units prior to transmitting the data units to another PFE or the network. To facilitate this processing, PFE 110-x may reassemble the data units into a packet and perform a route lookup for the packet using the forwarding table from RE 130 to determine destination information. If the destination indicates that the packet should be sent out on a physical link connected to PFE 110-x, then PFE 110-x may prepare the packet for transmission by, for example, segmenting the packet into data units, adding any necessary headers, and transmitting the data units from the port associated with the physical link.

Figure 2:
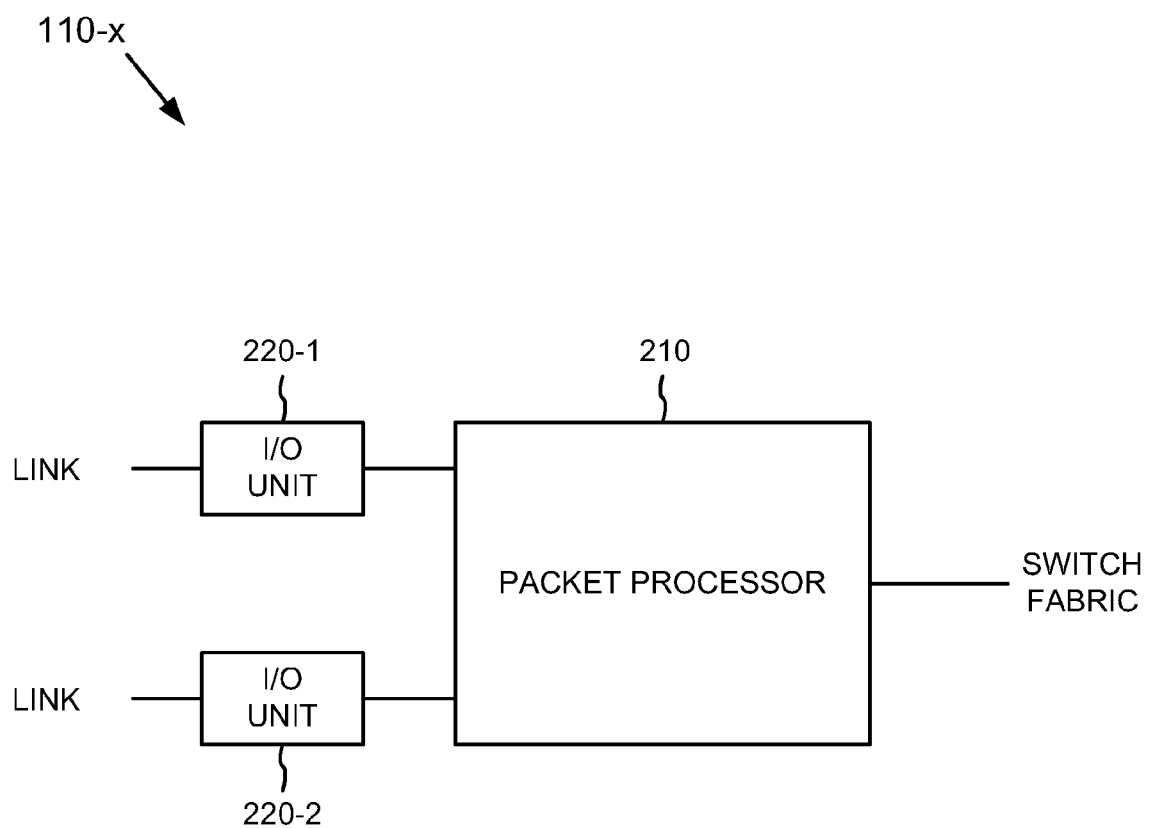
FIG. 2 is an exemplary block diagram of a portion of a packet forwarding engine of FIG. 1.

FIG. 2 is an exemplary block diagram illustrating a portion of PFE 110-x according to an implementation consistent with the principles of the invention. PFE 110-x may include a packet processor 210 and a set of input/output (I/O) units 220-1 through 220-2 (collectively referred to as I/O units 220). Although FIG. 2 shows two I/O units 220 connected to packet processor 210, in other implementations consistent with principles of the invention, there can be more or fewer I/O units 220 and/or additional packet processors 210.

Packet processor 210 may perform routing functions and handle packet transfers to and from I/O units 220 and switch fabric 120. For each packet it handles, packet processor 210 may perform the previously-discussed route lookup function and may perform other processing-related functions.

An I/O unit 220-y (where I/O unit 220-y refers to one of I/O units 220) may operate as an interface between its physical link and packet processor 210. Different I/O units may be designed to handle different types of physical links.

Figure 3:
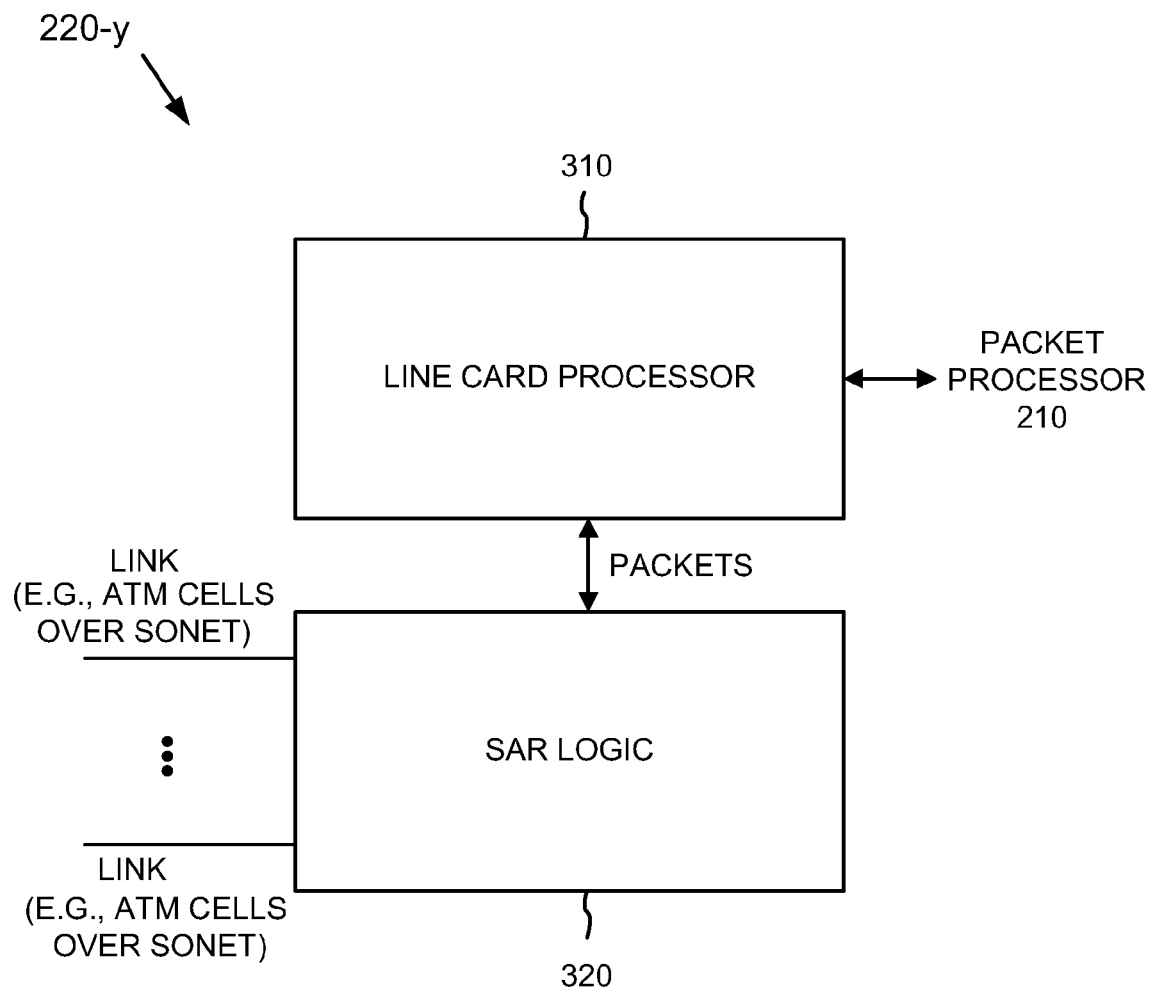
FIG. 3 is an exemplary block diagram of a portion of an input/output (I/O) unit of FIG. 2.

FIG. 3 is an exemplary block diagram of a portion of I/O unit 220-y according to an implementation consistent with the principles of the invention. In this particular implementation, I/O unit 220-y may operate as an interface to an ATM link.

I/O unit 220-y may include a line card processor 310 and segmentation and reassembly (SAR) logic 320. Line card processor 310 may process packets prior to transferring the packets to packet processor 210 or it may process packets from packet processor 210 before transmitting them to SAR logic 320. SAR logic 320 may segment packets received from line card processor 310 into data units (e.g., ATM cells) for transmission on the physical links (e.g., SONET links) and reassemble packets from data units received on the physical links. SAR logic 320 may send reassembled packets to line card processor 310.

Figure 4:
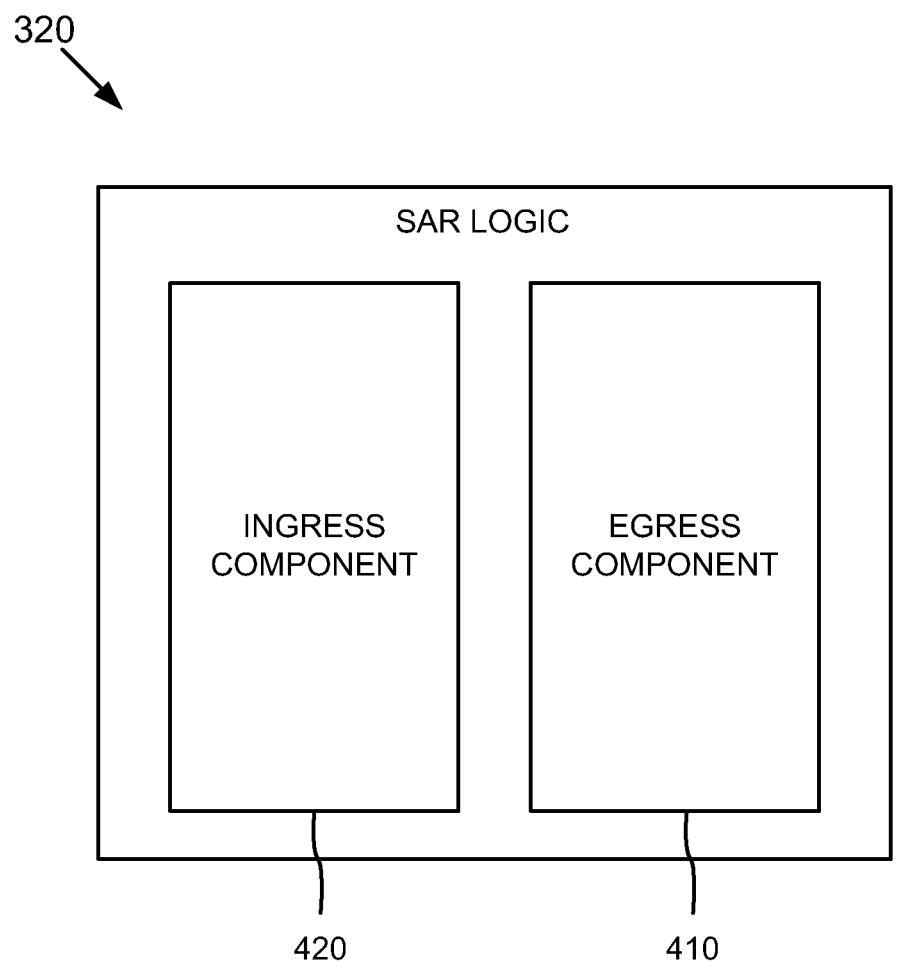
FIG. 4 is an exemplary block diagram of a portion of the segmentation and reassembly (SAR) logic of FIG. 3.

FIG. 4 is an exemplary diagram of a portion of SAR logic 320. SAR logic 320 may include an ingress component 420 and an egress component 410. Ingress component 420 may receive fixed sized data units, such as ATM cells, and reassemble the cells into a variable size data unit, such as packet data. Similarly, egress component 410 may receive variable size data units, such as packet data, and segment the packets into fixed sized data units, such as cells. The cells may be transmitted from system 100 via one or more output ports (not shown) connected to a physical link. For example, an output port may connect to an optical transmission medium, such as a SONET link having an optical carrier level of OC-12 (622.08 Mbps) or OC-3 (155.52 Mbps).

Ingress component 420 may receive data units on particular data flows and reassemble the data units into packets. To do this, ingress component 420 may maintain information regarding a data flow with which a packet is associated and associate each arriving data unit of the packet with that data flow. Ingress component 420 may process packets across multiple packet flows that are received at multiple associated input ports. Generally, each flow may be configured (provisioned) per port before ingress component 420 receives any data units associated with that flow.

The data units associated with a particular packet may arrive at various times. Each data unit may include a header and data.

Figure 5:
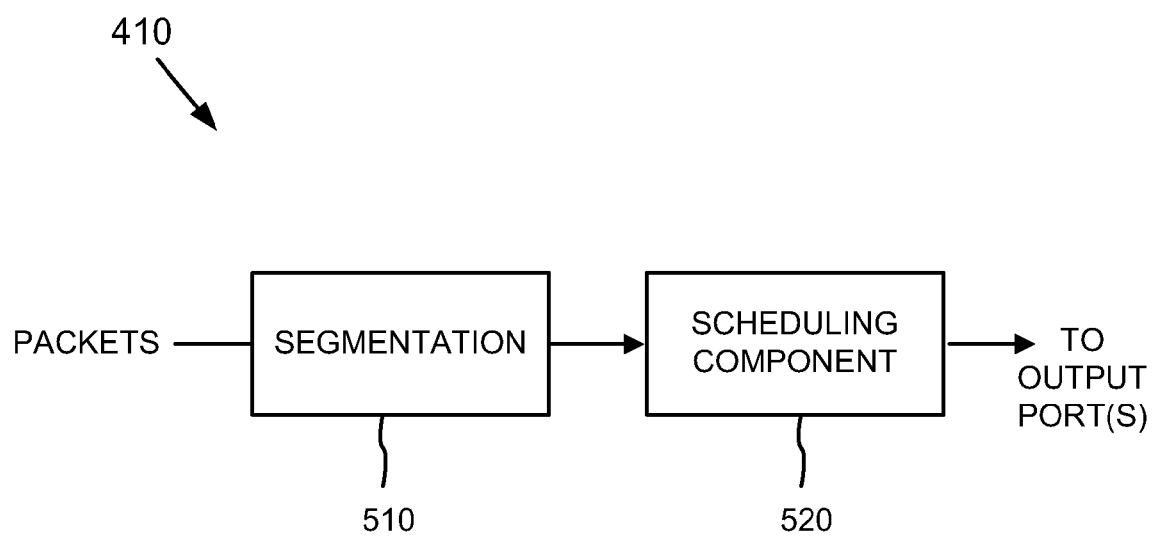
FIG. 5 is a diagram illustrating portions of the egress portion shown in FIG. 4 in additional detail.

FIG. 5 is a diagram illustrating portions of egress component 410 in additional detail. Egress component 410 may include a segmentation component 510 and a scheduling component 520. Segmentation component 510 may receive the input packets and segment the packets into fixed-length data units, which will be described herein as ATM cells, although other data unit formats could also be used. The cells may be output to scheduling component 520, which generally handles scheduling of the cells for transmission. The actual transmission may be handled by an output port(s), which puts the cells on the physical link.

Figure 6:
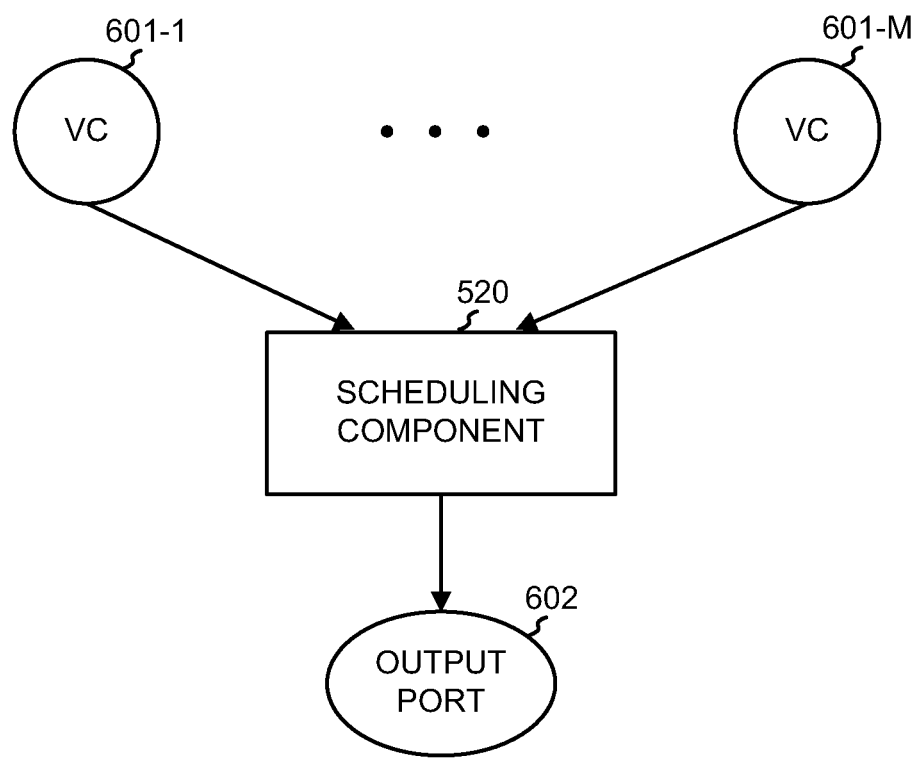
FIG. 6 is a diagram conceptually illustrating the operation of the scheduling component shown in FIG. 5 in additional detail.

FIG. 6 is a diagram conceptually illustrating the operation of scheduling component 520 in additional detail. The cells received from segmentation component 510 may be organized into a number of virtual circuits (VCs) 601-1 through 601-M (collectively referred to as virtual circuits 601), which may correspond to packet flows in the network. In general, a packet flow may be defined as packets having a set of common properties derived from the packets. For example, a particular packet flow may be created to send data between two endpoints that desire a particular quality of service (QoS) level (e.g., a packet flow being used to carry a video transmission between two endpoints). Cells corresponding to packets in the packet flow may belong to one of VCs 601. Cells in different VCs 601 may contend for access to a particular output port, such as output port 602. Scheduling component 520 schedules the sequence of cells that are sent to this port.

VCs 601 may each be defined by a number of traffic shaping parameters. In particular, a VC may be defined by a Peak Cell Rate (PCR) value, a Sustainable Cell Rate (SCR) value, a Maximum Burst Size (MBS) value, and/or a Cell Delay Variation (CDV) value. The values for these parameters may differ between VCs. Scheduling component 520 attempts to schedule cells from each of VCs 601 such that the cells from each VC are sent to output port 602 in a manner that satisfies the traffic shaping parameters. In general, the traffic shaping parameters operate to control the availability of bandwidth to network users according to their traffic contracts and to define the spacing or interval between cells in order to mitigate buffering requirements.

Scheduling Component 520

Figure 7:
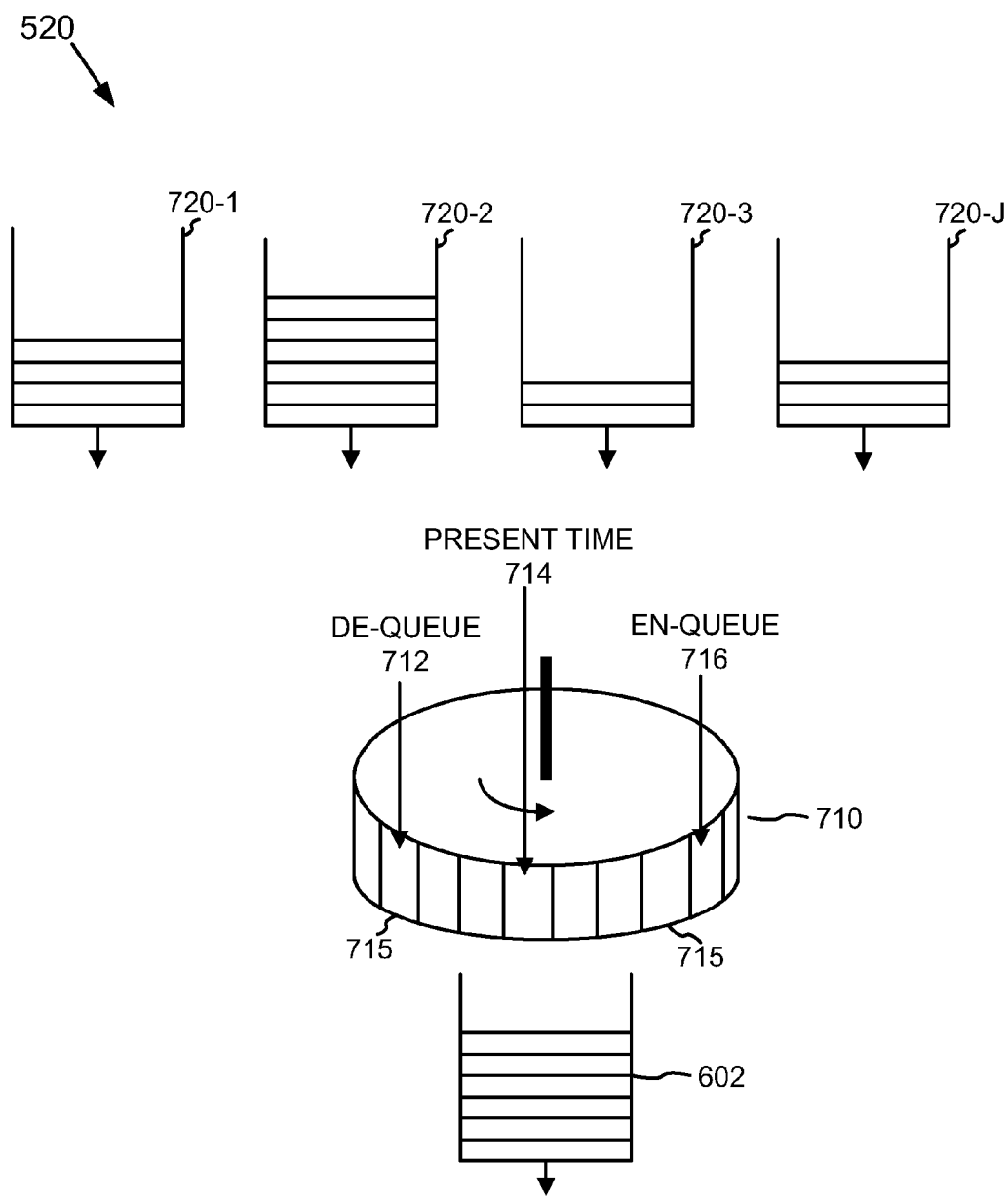
FIG. 7 is a diagram conceptually illustrating portions of the scheduling component shown in FIG. 5.

FIG. 7 is a diagram conceptually illustrating portions of scheduling component 520. More specifically, scheduling component 520 may use a rate wheel 710 to schedule cell traffic from VCs 601 to output port 602. Rate wheel 710 is conceptually illustrated in FIG. 7 as a "wheel" containing evenly spaced slots 715 in which cells are scheduled. In practice, rate wheel 710 may generally be implemented as a circular memory structure that may be maintained in random access memory or another type of computer-readable medium.

The various VCs 601 are illustrated in FIG. 7 as corresponding to queues 720-1 through 720-J (collectively referred to as queues 720). Queues 720 may be first-in first-out (FIFO) queues. One of queues 720 may correspond to a single VC or packet flow.

A number of pointers may be associated with rate wheel 710. As shown, a de-queue pointer 712, a present time pointer 714, and an en-queue pointer 716 may each point to various slots on rate wheel 710. Pointers 712, 714, and 716 may each be maintained by scheduling component 520. De-queue pointer 712 indicates the current position on rate wheel 710 at which flows are being serviced. Cells being currently serviced are transferred to output port 602 for transmission on the link. Output port 602 may include an output buffer for queuing data for transmission. En-queue pointer 716 indicates the future position of each newly scheduled flow. Cells from one of queues 720 may be scheduled in slots on rate wheel 710 at evenly spaced slot intervals determined by the traffic shaping parameters corresponding to the queue. For example, the next slot that is to be scheduled for a queue may be based on the previously scheduled slot offset by the cell interval (e.g., 1/PCR) for the queue. If no cell from one of queues 720 is scheduled to be included on rate wheel 710 at a particular time interval corresponding to the slot, an "idle cell" may be included on the rate wheel for that slot. The idle cell may later be transmitted to output buffer 602. Idle cells are generally used to maintain the cell interval at the output port. Without idle cells, output buffer 602 may "collapse" the intended idle spacing between two cells and place them closer together than desired.

Present time pointer 714 may include a counter that increments at the cell rate (the rate corresponding to the interval at which cells are transmitted from the output port) or faster. The count value of present time pointer 714 may be stalled whenever the buffer in output port 602 is full. Thus, present time pointer 714 may increment at the "logical" cell rate (or faster) when room exists in output port 602. Because the counter of present time pointer 714 can operate faster than the cell rate, present time pointer 714 may stall and then "catch up" in order to keep output port 602 full.

The number of slots in rate wheel 710 may be based on the line rate of the output port relative to the slowest possible output rate. For an OC-12 SONET output port, for example, rate wheel 710 may be constructed using 16 k slots. For an OC-3 SONET output port, rate wheel 710 maybe constructed using 4 k slots.

Figure 8:
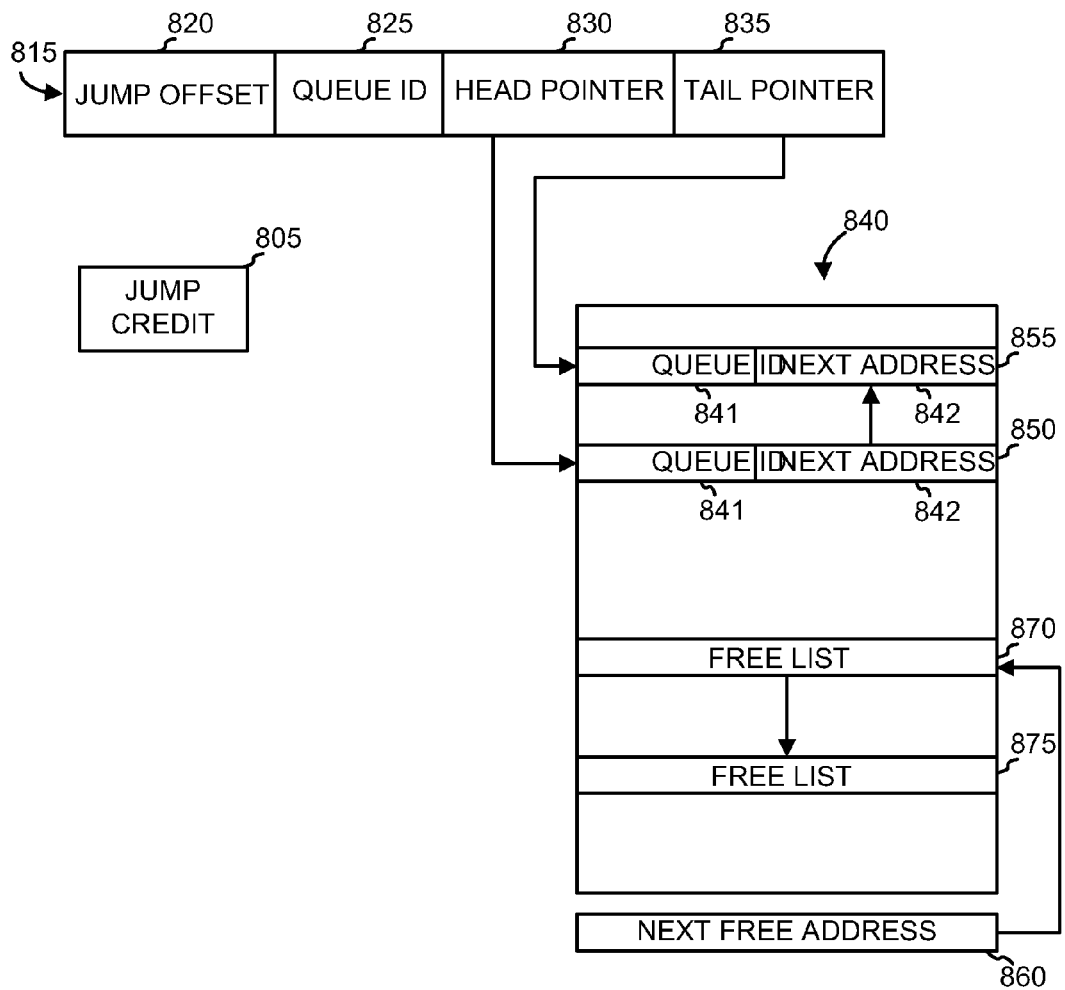
FIG. 8 is a diagram illustrating an exemplary slot in the rate wheel shown in FIG. 7 in additional detail.

FIG. 8 is a diagram illustrating one of the slots of rate wheel 710 (labeled as slot 815 in FIG. 8) in additional detail. Slot 815 may include a number of fields, such as a jump offset field 820, a queue ID field 825, a head pointer field 830, and a tail pointer field 835. Slot 815, instead of physically storing the cell assigned to it, may instead store queue ID field 825, which acts as a pointer to the queue that contains the scheduled cell. In one implementation, a value of zero means that there is no cell scheduled in that slot (i.e., the slot is empty).

Because flows from multiple queues 720 are being scheduled, each with a potentially different cell transmission rate, it is possible that multiple flows will attempt to schedule a cell in the same slot. This is referred to herein as a "collision." Collisions may be handled by scheduling multiple cell transmissions in a single slot. Head pointer 830 and tail pointer 835 may be used to handle the collisions by pointing to a linked-list of additional queue ID fields. Such a linked-list is shown in FIG. 8 as list 840. Each entry in linked-list 840 may include a queue ID field 841, similar to queue ID field 825, and a pointer 842 to the next entry in linked-list 840. In the example list illustrated in FIG. 8, head pointer 830 points to entry 850 in linked-list 840. The queue ID 841 of entry 850 points to a second one of queues 720 that attempted to schedule a cell in slot 815. Pointer 842 of entry 850 points to another colliding entry 855—the third queue 720 that attempted to schedule a cell in slot 815. Tail pointer 835 may also point to entry 855, indicating that this is the last entry in the linked-list for this particular slot.

Scheduling component 520, when adding a colliding entry to linked list 840, may add the entry at the location of the next free address entry, which may be pointed-to by a next free address pointer 860. When the slot is later accessed and a colliding entry in linked list 840 is sent to output port 602, the entry is then classified as a free entry and added to the end of a linked-list of free entries. In FIG. 8, two free entries are illustrated (entries 870 and 875). When another entry becomes free, entry 875 may be modified to point to the free entry. Similarly, when entry 870 is taken and added to a slot, next free address pointer 860 may be modified to point to entry 875.

Jump offset value 820 is stored on a per-slot basis, and as will be described in more detail below, assists scheduling component 520 in "jumping" over empty slots on the rate wheel. By jumping over empty slots, scheduling component 520 can optimize the bandwidth utilization at output port 602. In addition to jump offset value 820, other values are stored by scheduling component 520 and used to assist in jumping over empty slots. Jump credit 805 is one such value. Unlike jump offset value 820, which is stored on a per-slot basis, jump credit 805 may be a global value that is stored by scheduling component 520 for each rate wheel 710.

Operation of Rate Wheel 710

Figure 9:
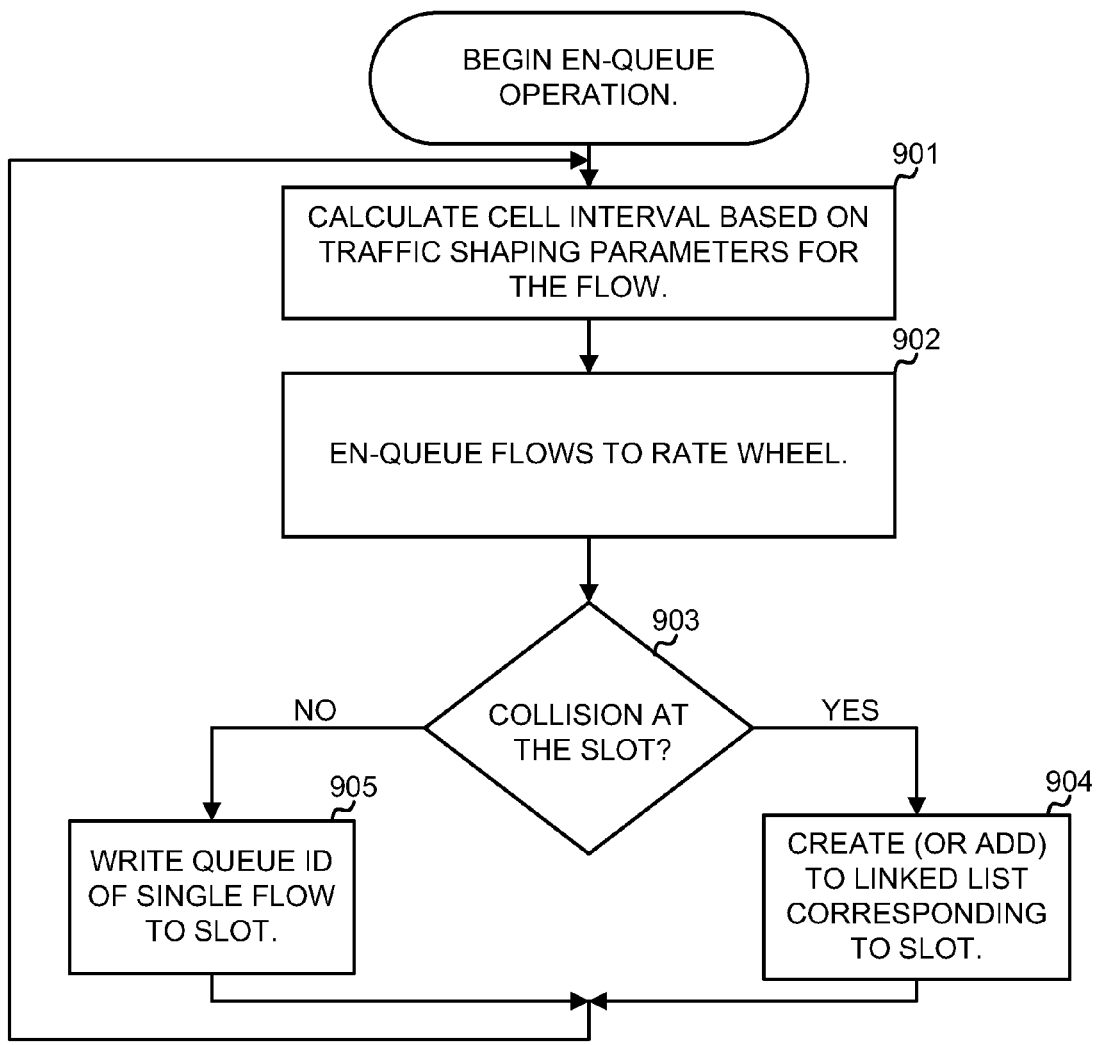
FIG. 9 is a flow chart illustrating exemplary operation of the scheduling component in en-queuing flows from the rate wheel.

FIG. 9 is a flow chart illustrating operation of scheduling component 520 in en-queuing flows from queues 720 to rate wheel 710. Flows may be scheduled based on a number of traffic shaping parameters (e.g., PCR, SCR, MBS, CDV). For each queue 720, scheduling component 520 may calculate a cell interval based on the traffic shaping parameters for the flow (act 901). For example, each slot on rate wheel 710 may be considered a cell slot on the link. Thus, if the traffic shaping parameters for a flow dictate that the flow should be sent at one-quarter the link rate, then scheduling component 520 will en-queue the queue ID 825 of the flow at every fourth slot.

Based on the calculated cell intervals, scheduling component 520 en-queues the flows, corresponding to queues 720, at the designated slots (act 902). En-queue pointer 716 points to a position on rate wheel 710 at which the particular queue ID is being written. En-queue pointer 716 advances around rate wheel 710 as the flows are written. Scheduling component

520 may ensure that en-queue pointer 716 does not wrap de-queue pointer 712 before writing to the next position.

Slots at which no flows are scheduled are empty cell slots. Empty cell slots, when transmitted to output port 602, will result in unused bandwidth on the physical link. Accordingly, it is desirable to minimize empty slots to the extent that the empty slots (idle cells) are not required to maintain a desired interval between cells.

Scheduling component 520 may locate collisions when multiple flows attempt to schedule a single slot (act 903). When a collision is found, scheduling component 520 writes the queue ID of the first flow to queue ID field 825 and adds the queue IDs of the remaining flows to linked-list 840, as previously discussed (act 904). When there is no collision, the queue ID of the single flow is written to queue ID field 825 (act 905). Head pointer 830 and/or tail pointer 835 may be given the value null, indicating that they do not point to any additional flows.

Figure 10:
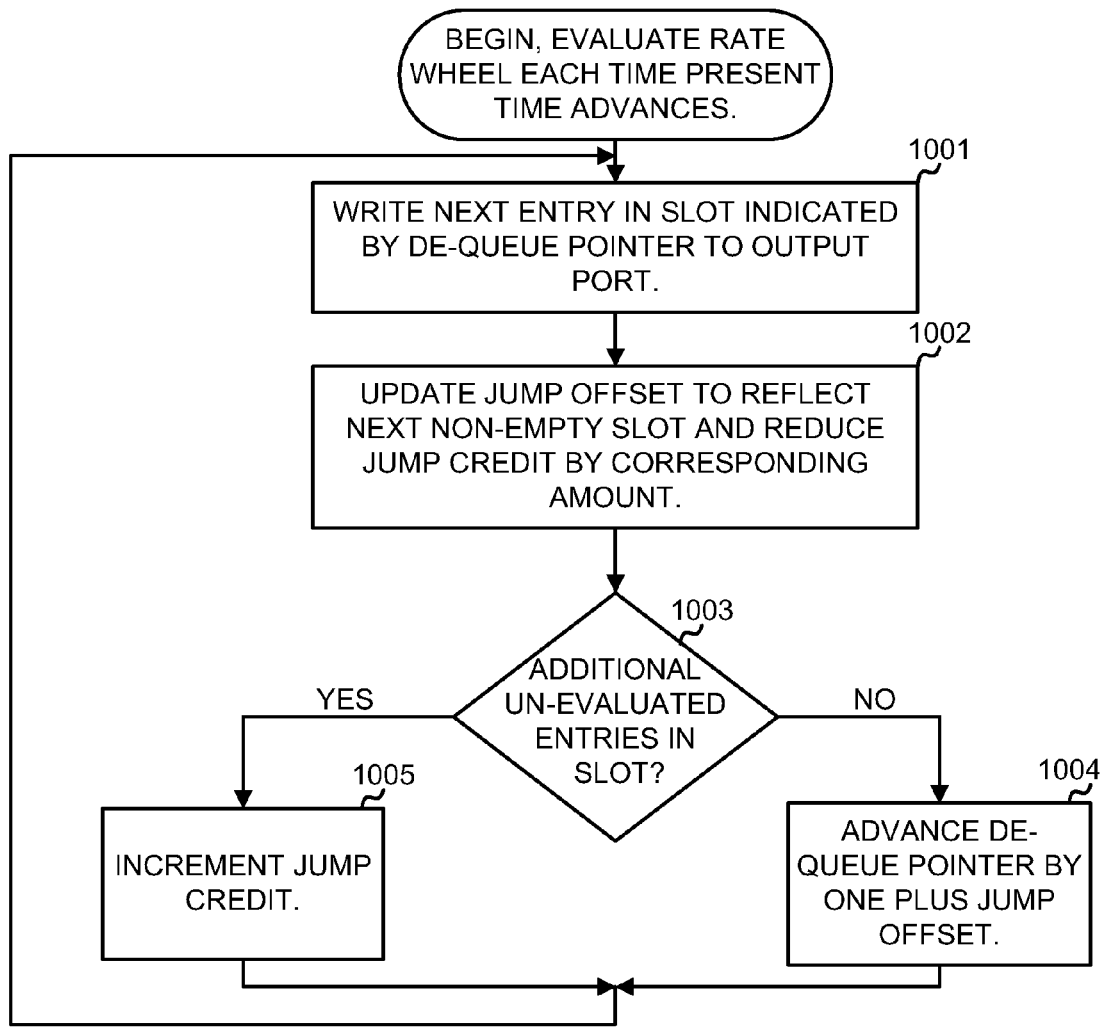
FIG. 10 is a flow chart illustrating exemplary operation of the scheduling component in de-queuing flows from the rate wheel.

FIG. 10 is a flow chart illustrating operation of scheduling component 520 in de-queuing flows from rate wheel 710. Rate wheel 710 may be evaluated each time present time counter 714 is advanced. As previously mentioned, present time pointer 714 may be advanced at a rate faster than the rate of output port 602. When the buffer in output port 602 is full, present time pointer 714 may not advance.

Scheduling component 520 may write the next entry in the slot indicated by de-queue pointer 712 to output port 602 (act 1001). In particular, the next cell from the queue corresponding to queue ID 825 of the current slot is written to output port 602. De-queue pointer 712 is advanced as the cells are written to output port 602. The amount to advance de-queue pointer 712 depends on the value in jump offset field 820 and on whether the current slot is a collision slot. Jump offset field 820 may contain a value that advances de-queue pointer 712 over empty slots and to the next non-empty slot when the last entry in a slot is processed.

The jump offset value for the slot may be updated to reflect the location of the next non-empty slot (act 1002). For example, if the next two slots on rate wheel 710 are empty and the third slot contains an entry, jump offset field 820 may be given a value of two, indicating that the next two slots can be "jumped." Jump credit field 805 is used to indicate how many slots are available to be jumped over, which should not be more than the number of accumulated collisions. As jump offset fields 820 are incremented, jump credit field 805 is correspondingly decremented. Accordingly, when updating jump offset field 820, this field may only be updated up to the value of jump credit field 805 (act 1002). In other words, jump offset field 820 can only be set to indicate a jump value up to the point to which jump credit field 805 indicates a jump credit is available.

If the current slot is a collision slot with additional, un-evaluated entries, jump credit field 805 is incremented (acts 1003 and 1005). De-queue pointer 712 is not advanced in this situation as there are more entries in the slot. However, if the current entry is the last entry in the slot, scheduling component 520 may advance de-queue pointer 712 by one plus the value of the jump offset value (acts 1003 and 1004). In the situation in which the jump offset value for the slot was not updated, the jump offset value is zero, resulting in de-queue pointer 712 advancing by one (act 1004).

Figure 11B:
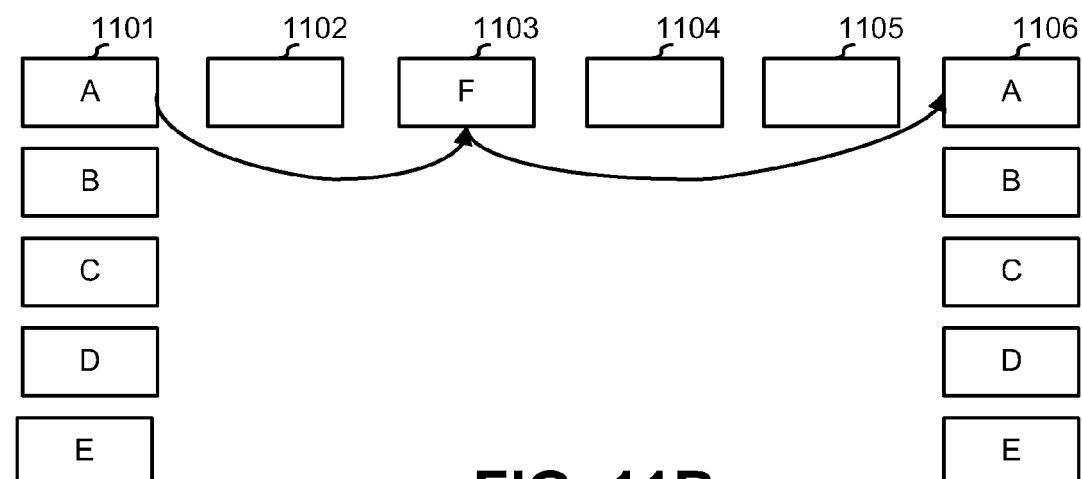

FIGS. 11A and 11B are diagrams that conceptually illustrate an exemplary set of de-queue operations.

In FIG. 11A, assume that there are five flows, labeled as flows "A" through "E", each having traffic shaping parameters that dictate a fixed cell interval of five slots. Further assume that the five flows all collide in first slot 1101 of rate wheel 710. Flow A is placed in the primary entry in slot 1101 and flows B through E are placed in a linked-list of colliding entries. When de-queue pointer 712 reaches slot 1101, it will be stopped at slot 1101 for five cycles of present time pointer 716 as each of flows A through E are processed. Without the ability to jump slots, as described above with reference to FIG. 10, idle cells are emitted at slots 1102-1105 and sent to output port 602. As a result, only $5/9^{th}$ of available bandwidth would be used, and the rate achieved for each flow is $1/9^{th}$, rather than the desired $1/5^{th}$ of the available port rate. With the ability to jump slots, however, as described above, the jump offset value is incremented to a value of four and the de-queue pointer is advanced five slots (4+1) to advance to slot 1106. Accordingly, slots 1102-1105 are skipped after processing is completed at slot 1101. No idle cells are emitted, each flow is transmitted at the desired port rate, and the full output port bandwidth is used.

In FIG. 11B, assume that in addition to the five colliding flows A through E, an additional flow "F" is present. Flow F is scheduled at slot 1103. When de-queue pointer 712 reaches slot 1101, it will be stopped at slot 1101 for five cycles of present time pointer 716 as each of flows A through E are processed. The jump offset value for slot 1101 will be set to point to the next non-empty slot, slot 1003. Jump credit 805 will have additional credits available after setting the offset pointer for slot 1101, however, as four flows collided in slot 1101, but the next non-empty slot is only two slots ahead of slot 1101. Accordingly, the jump offset value for slot 1103 is set to point to slot 1106. In this manner, a linked-list of jump slots are created by which empty slots can be skipped to fully use the bandwidth at output port 602.

Hierarchical Shaping of Queue Groups

Multiple packet flows (VC) with individual traffic shaping parameters may be grouped to share common traffic shaping parameters (VP). The grouping may be implemented as a queue group in scheduling component 520. For ATM, queue groups may correspond to Virtual Path (VP) tunnels through the ATM network.

FIG. 12 is a diagram illustrating the concept of a queue group in additional detail. In general, flows 1205 may be combined into queues 1210, which may be further combined into queue groups 1215. Flows 1205 (e.g., virtual circuits in ATM) may combine into a single one of queues 1210 as long as they share the same port. Queues may be further grouped into queue groups 1215 that share common traffic shaping parameters. Queue groups 1215 may correspond to VP tunnels in ATM networks.

FIG. 13 is a diagram conceptually illustrating hierarchical shaping of queue groups consistent with an aspect of the invention. Incoming flows may be combined into queues 1310, which may include a number of queues, such as the queues 1210 (FIG. 12) or 720 (FIG. 7). Queues 1310 may be scheduled by a rate wheel 1315. Rate wheel 1315 may be implemented in a manner similar to rate wheel 710 (FIG. 7). In other words, queues 1310 and rate wheel 1315 may act to initially schedule flows from queues 1310 in a manner that optimizes use of the available bandwidth. Accordingly, traffic may be initially scheduled at the flow (e.g., VC) level by rate wheel 1315. Traffic shaping parameters may be applied to each flow or queue.

Traffic may next be scheduled at the queue group level. The flows may be added to queue groups 1320 (VPs) that rate wheel 1325 uses as its input source. Flows are scheduled in rate wheel 1325 according to their availability in their respective queue group and the specified rate of the VP tunnel corresponding to the queue group. Rate wheel 1325 may be implemented in a manner similar to rate wheel 710 (FIG. 7).

FIG. 14 is a diagram illustrating an exemplary implementation of queue groups 1320 and rate wheel 1325 in additional detail. Queue groups 1320 may include a number of individual queue groups 1405-1 through 1405-N, which, in the context of ATM, may each be associated with a VP tunnel. Each queue group 1405 may handle all of the flows for the particular VP tunnel. Queue group 405-1, for example, may include queues 1410-1 through 1410-M, one for each flow or multiple combined flows in the queue group. VP scheduling component 1415 may transmit the next data unit that is to be handled by rate wheel 1325 based on the transmission interval corresponding to the queue group (e.g., the transmission interval of the VP tunnel). In other words, rate wheel 1325 may receive data from queue groups 1405-1 through 1405-N based on traffic shaping parameters applied at the queue group level.

Further, the selection order at which queues 1410-1 through 1410-N are selected by VP scheduling component 1415 may be based on an arbitration scheme such as a round-robin arbitration scheme. The round-robin arbitration performed by each of queue groups 1405 may be implemented by storing a round-robin list that references each active queue 1410 in the queue group. When a queue is added to a queue group 1405 an identifier that identifies that queue 1410 is stored in the round-robin list. VP scheduling component 1415 may then schedule the flows from the queues 1410 based on the next queue identifier in the round-robin list and on the rate assigned to the VP for the queue group 1405. When a queue 1410 becomes empty, it may be removed from the list. If there are no queues scheduled for a queue group 1405, and a new flow is received, the flow may be directly scheduled on rate wheel 1325.

Rate wheels 1315 and 1325, as described with reference to FIGS. 13 and 14, provide for hierarchical shaping. In the context of ATM networks, for example, rate shaping may initially be applied at the per-VC level and then again at the VP level. In this manner, VCs and VP tunnels can be independently shaped.

CONCLUSION

Hierarchical traffic shaping was described herein using stacked circular memory structures (e.g., rate wheels). Additionally, within a queue group, individual flows may be selected to be placed on a rate wheel corresponding to the queue groups using an arbitration scheme such as round-robin scheduling.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while series of acts have been presented with respect to FIGS. 9 and 10, the order of the acts may be different in other implementations consistent with principles of the invention. Also, non-dependent acts may be implemented in an order different than shown, or in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of the invention is defined by the claims and their equivalents.

What is claimed:

1. A method comprising:
   calculating, by a network device, an interval based on a parameter for a flow from a queue;
   enqueuing, by the network device, the flow at a slot of a first structure based on the interval;
   identifying, by the network device, a collision at the slot;
   writing, by the network device, an identifier of the queue in a field of the slot based on identifying the collision at the slot;
   storing, by the network device, one or more queue identifiers associated with one or more other flows that caused the collision in a data structure associated with the slot;
   dequeuing, by the network device, the flow and the one or more other flows from the first structure; and
   adding, by the network device, the flow and the one or more other flows to one or more queue groups that a second structure uses as an input source.

2. The method of claim 1, where the first structure is at a virtual circuit level.

3. The method of claim 1, where the queue groups correspond to a virtual path tunnels.

4. The method of claim 1, further comprising:
   scheduling the flow in the second structure based on availability of flows in a queue group, of the one or more queue groups, that includes the flow.

5. The method of claim 1, further comprising:
   scheduling the flow in the second structure based on a rate of a virtual path tunnel corresponding to a queue group, of the one or more queue groups, that includes the flow.

6. The method of claim 1, where adding the flow and the one or more other flows to the one or more queue groups comprises:
   adding the queue to a queue group of the one or more queue groups.

7. The method of claim 6, further comprising:
   storing the identifier of the queue in a round robin list based on adding the queue to the queue group.

8. The method of claim 1, further comprising:
   scheduling the flow in the second structure based on a position of the identifier of the queue in a round robin list.

9. The method of claim 1, further comprising:
   determining that there are no queues to be scheduled for a queue group of the one or more queue groups,
   receiving a new flow, and
   directly scheduling the new flow in the second structure based on determining that there are no queues to be scheduled for the queue group.

10. A device comprising:
    a scheduling component, at least partially implemented in hardware, to:
    calculate an interval based on a parameter for a flow from a queue;
    enqueue the flow at a slot of a first structure, of the scheduling component, based on the interval;
    identify a collision at the slot;
    write, based on identifying the collision, an identifier of the queue in a field of the slot;
    store one or more queue identifiers associated with one or more other flows that caused the collision in a data structure associated with the slot;

dequeue the flow after storing the one or more queue identifiers; and
add the flow to a queue group that a second structure uses as an input source.

11. The device of claim 10,
where the first structure corresponds to a virtual circuit level, and
where the queue group corresponds to a virtual path tunnel.

12. The device of claim 10, where the parameter comprises one of:
a Peak Cell Rate (PCR) value,
a Sustainable Cell Rate (SCR) value,
a Maximum Burst Size (MBS) value, or
a Cell Delay Variation (CDV) value.

13. The device of claim 10, where the second structure is arranged hierarchically relative to the first structure.

14. The device of claim 10, where the scheduling component is further to:
schedule the flow in the second structure based on a rate of a virtual path tunnel corresponding to the queue group.

15. The device of claim 10,
where, when adding the flow to the queue group, the scheduling component is to:
add the queue to a queue group, and
where the scheduling component is further to:
store the identifier of the queue in a round robin list based on adding the queue to the queue group.

16. A system comprising:
a first scheduling component, at least partially implemented in hardware, to:
calculate an interval based on a parameter for a flow from a queue;
enqueue the flow at a slot of a first circular memory structure based on the interval;
identify a collision at the slot;
write, based on identifying the collision, an identifier of the queue in a field of the slot;
store one or more queue identifiers associated with one or more other flows that caused the collision in a data structure associated with the slot;
dequeue the flow from the first circular memory structure after storing the one or more queue identifiers; and
add the flow to a second scheduling component that a second circular memory structure uses as an input source.

17. The system of claim 16, where the second circular memory structure is arranged hierarchically relative to the first circular memory structure.

18. The system of claim 16, where the second scheduling component includes a plurality of queue groups.

19. The system of claim 18, where the plurality of queue groups corresponds to virtual path tunnels.

20. The system of claim 16, where the data structure is a linked-list.

* * * * *